United States Patent
Watanabe

(10) Patent No.: US 9,906,679 B2
(45) Date of Patent: Feb. 27, 2018

(54) IMAGE FORMING DEVICE AND IMAGE FORMING METHOD

(71) Applicant: Oki Data Corporation, Tokyo (JP)

(72) Inventor: Taisuke Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/269,529

(22) Filed: Sep. 19, 2016

(65) Prior Publication Data
US 2017/0094102 A1 Mar. 30, 2017

(30) Foreign Application Priority Data
Sep. 30, 2015 (JP) .................................. 2015-192414

(51) Int. Cl.
| G03G 15/08 | (2006.01) |
| H04N 1/32 | (2006.01) |
| G03G 15/00 | (2006.01) |
| H04N 1/00 | (2006.01) |
| B41M 3/14 | (2006.01) |
| G03G 21/04 | (2006.01) |
| G03G 9/09 | (2006.01) |

(52) U.S. Cl.
CPC ........ *H04N 1/32352* (2013.01); *B41M 3/144* (2013.01); *G03G 15/50* (2013.01); *G03G 15/6585* (2013.01); *H04N 1/00838* (2013.01); *G03G 9/0926* (2013.01); *G03G 21/04* (2013.01); *H04N 2201/0094* (2013.01)

(58) Field of Classification Search
CPC ........ G03G 15/01; G03G 15/50; G03G 21/04; G03G 15/6585; G03G 3/0926; B41M 3/144; H04N 1/00; H04N 1/32; H04N 1/32352; H04N 1/00838
See application file for complete search history.

(56) References Cited

U.S. PATENT DOCUMENTS

| 6,673,500 B1 | 1/2004 | Patel et al. |
| 2012/0213537 A1* | 8/2012 | Harashima ......... G03G 15/0189 399/49 |
| 2014/0168426 A1 | 6/2014 | Andres et al. |

FOREIGN PATENT DOCUMENTS

| JP | 2009-086334 A | 4/2009 |
| WO | WO 2003-056500 A1 | 7/2003 |

* cited by examiner

*Primary Examiner* — Hoang Ngo
(74) *Attorney, Agent, or Firm* — Rabin & Berdo, P.C.

(57) ABSTRACT

An image can be formed by using a developer containing a luminescent substance, without impairing the finish of the area in which the image is formed. An image forming device 100 includes a print function section 124 which forms a first image included in a plurality of images to be formed on a single page, based on image formation data indicating the image to be formed, on a medium by using a first developer, and forms a second image included in the plurality of images, based on the image formation data, in a non-image-forming area in which the first image is not formed on the medium, by using a second developer containing a luminescent substance.

12 Claims, 10 Drawing Sheets

FIG. 2

| ITEM | VALUE |
|---|---|
| USER NAME | YAMADA |
| USER'S DEPARTMENT | DEVELOPMENT DEPARTMENT |
| SERVICE YEAR | 11 |
| POST | UNIT HEAD |
| INPUT JOB TYPE | E-MAIL SENDING |
| SETTING VALUE (DESTINATION ADDRESS) | Abe@oki.com |
| SETTING VALUE (FILE FORMAT) | PDF |
| JOB INPUT TIME | 15:03 |

IMAGE FORMING DEVICE AND IMAGE FORMING METHOD

BACKGROUND OF THE INVENTION

1. Field of the Invention

The present invention relates to image forming devices and image forming methods, and more specifically, to image forming devices and image forming methods for forming images by using developer containing luminescent substances.

2. Description of the Related Art

As one of the methods performing high-value-added image formation by using an image forming device such as a multifunctional printer, a method is proposed in which serial numbers for anti-counterfeiting and property information such as author names, creation dates, or update histories of images to be generated are added to the images by using UV toner (invisible toner) which cannot be seen under visible light and can be seen only under ultraviolet light emitted from black lights or the like (see Japanese Patent Application Publication No. 2009-86334).

SUMMARY OF THE INVENTION

However, even if the UV toner is used for printing, the printed contents are not completely invisible, and the printed contents may be recognizable under common room lights or the like. In addition, surface luster sometimes prevents an intended finish from being obtained.

An object of the present invention is to make it possible to form images by using developer containing luminescent substances, without impairing finishes of areas in which the images are formed.

An image forming device according to one aspect of the present invention includes a first image forming section which forms a first image included in a plurality of images to be formed on a single page, based on image formation data indicating the image to be formed, on a medium by using a first developer and a second image forming section which forms a second image included in the plurality of images, based on the image formation data, in a non-image-forming area where the first image is not formed on the medium, by using a second developer containing a luminescent substance.

An image forming method according to one aspect of the present invention includes steps of forming a first image included in a plurality of images to be formed on a single page, based on image formation data indicating the image to be formed, on a medium by using a first developer and forming a second image included in the plurality of images, based on the image formation data, in a non-image-forming area where the first image is not formed on the medium, by using a second developer containing a luminescent substance.

According to one aspect of the present invention, images can be formed by using developer containing luminescent substances without impairing finishes of areas in which the images are formed.

BRIEF DESCRIPTION OF THE DRAWINGS

FIG. 2 is a schematic diagram showing an example of job input information when E-mail transmission is selected.

DETAILED DESCRIPTION OF THE INVENTION

Embodiment

Figure 1:
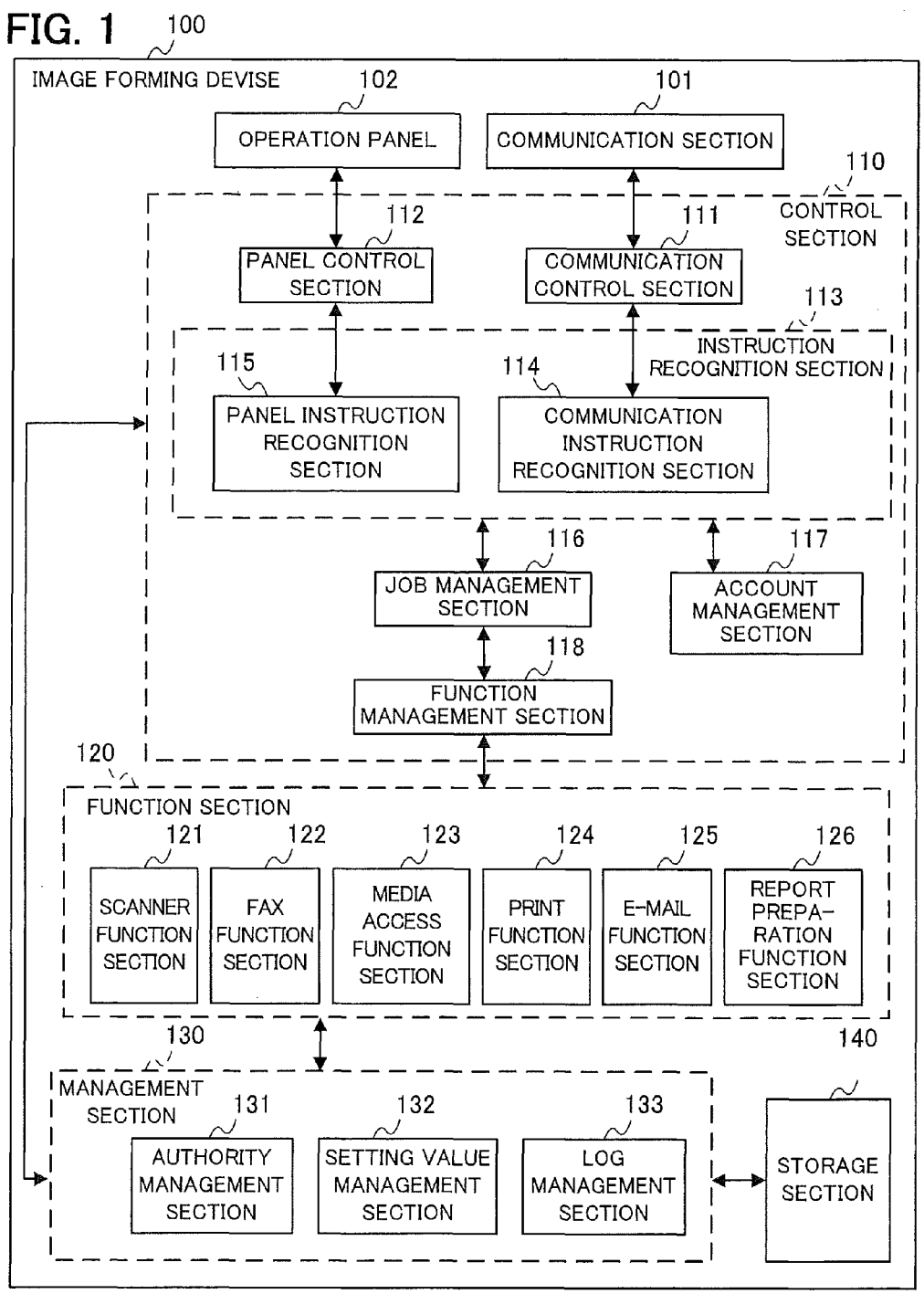
FIG. 1 is a block diagram schematically showing a configuration of an image forming device.

FIG. 1 is a block diagram schematically showing a configuration of an image forming device 100 according to an embodiment. This embodiment will be explained, supposing that the image forming device 100 is a multifunctional printer.

The image forming device 100 includes a communication section 101, an operation panel 102, a control section 110, a function section 120, a management section 130, and a storage section 140.

An image forming method is a method executed by the image forming device 100.

The communication section 101 communicates with external devices and functions as a receiving section which receives data and as a sending section which sends data. For example, the communication section 101 is an interface which is equipped with a protocol for communication and uses the protocol to communicate with the external devices. The communication section 101 functions as a doorway of the image forming device 100 for the external devices the same as the operation panel 102. When it transfers information, this communication section 101 does not perform spontaneous communication for transferring the information, but always operates according to orders from an upper layer. To be more specific, communication processing performed by the communication section 101 includes global communication processing such as communication processing on networks or by FAX (facsimile) as well as local communication processing such as communication processing according to USB (universal serial bus) or IEEE 1394. The communication section 101 is made up of mainly hardware parts, and as for software, it includes only part of microprograms. A microprogram is a dedicated program downloaded to hardware and the dedicated program does part of jobs to be done by hardware as substitute for the hardware.

The operation panel 102 functions as an input section which receives input of an operation and as an output section which outputs various pieces of information. For example, the operation panel 102 is an input-output device directly connected by an internal bus interface to the inside of the image forming device 100. The output is carried out by an LCD (liquid crystal display) panel or LEDs (light emitting diodes) functioning as a display section. The LCD panels vary in size, and the VGA (640×480 dots) is the largest size for panels that can be mounted on the image forming device 100. A plurality of LEDs are set, and each lighting pattern of the plurality of LEDs has each meaning. The input is received with buttons disposed on the operation panel 102. The operation panel 102 is made up of mainly hardware parts, and as for software, it includes only part of microprograms.

The control section 110 controls processing in the image forming device 100.

The control section 110 includes a communication control section 111, a panel control section 112, a instruction recognition section 113, a job management section 116, an account management section 117, and a function management section 118.

The communication control section 111 controls the communication section 101. For example, the communication control section 111 performs software processing for operating the communication section 101. A role of the communication control section 111 is to transfer received information to software of an upper layer in the image forming device 100 and to transfer information received from the software of the upper layer to external devices by controlling the communication section 101.

The panel control section 112 controls the operation panel 102. For example, the panel control section 112 performs software processing for controlling the operation panel 102. The panel control section 112 switches display images on the operation panel 102 in response to user's operations or events which occur in the image forming device 100. User's operations can be classified into two groups: screen operations to move screen images or to change display images; and operations to achieve purposes such as selecting values or making input. The panel control section 112 operates according to the former and transfers the latter to the panel instruction recognition section 115 to request to perform the processing of them. Events occurring inside are displayed on status-display screen images. The display processing is performed by converting information into bitmap images and transferring the bitmap images to the operation panel 102.

The instruction recognition section 113 controls the communication control section 111 or the panel control section 112. For example, the instruction recognition section 113 includes a communication instruction recognition section 114 and a panel instruction recognition section 115.

The communication instruction recognition section 114, which is the upper layer of the communication section 101, interprets received information transferred from the communication section 101 and processes simple actions required by results of the interpretation. When interpreting the received information, the communication instruction recognition section 114 finds commands included in the received information, analyzes the commands, and recognizes the contents required by the commands. The simple actions mean that the requirements of the commands are simple (such as referring to or changing setting values), therefore the communication instruction recognition section 114 requires the job management section 116 to process complicated actions. Since special processes are prepared for complicated requirements (such as printing), the communication instruction recognition section 114 transfers them to request the job management section 116 to perform the processing of them. Depending on commands to be processed, the communication instruction recognition section 114 requests authentication information from higher-level devices in order to confirm authority of the requesting sources. The communication instruction recognition section 114 carries out the authentication by using authentication information sent from the higher-level device; and if the authority is verified as a result of the authentication, it requests the job management section 116 to perform the processing by using user identifiers sent from the higher-level devices as arguments. Which enables the job management section 116 to identify users as the requesting sources and to judge whether the requested processing can be executed. Incidentally, whether the authentication processing is performed or not depends on authentication processing setting indicating ON or OFF, which is hold in the setting value management section 132. If the setting indicates OFF, the communication instruction recognition section 114 does not perform the authentication.

The panel instruction recognition section 115 recognizes the instruction contents on the basis of the user's operation information given through the operation panel 102 and the panel control section 112. For the recognition, an ordinary method is that users select one item on a menu image in which services or functions to be provided are displayed as items in a menu format. In the services or functions assigned to the items, services such as COPY, ScanToEmail, or ScanToFAX, and functions such as changing a setting are also included. COPY is a function to scan original documents and copy the images. ScanToEmail is a function to scan original documents and send E-mails enclosing the images. ScanToFAX is a function to scan original documents and send the images by FAX. If the requirements of the instructions are simple (such as referring to or changing setting values), the panel instruction recognition section 115 directly executes the processing. If the requirements of the instructions are complicated (such as printing), the panel instruction recognition section 115 transfers them to the job management section 116 to request to perform the processing, because special function sections are generally provided to process them as jobs.

The information input to the panel instruction recognition section 115 includes, in addition to the selection of the job as described above, also additional information that is necessary for the processing of the job. The additional information necessary for the processing of the job is, for example, a destination telephone number for FAX transmission, a destination mail address for E-mail transmission, and resolution, depth of color, single-sided or double-sided printing, the number of copies, and the like for printing. These are items of job input information.

The job input information is, when users input a job to the image forming device 100, information added to the job. When inputting a job, the user inputs an input job type, settings for each input job type and the like as well as first authentication information such as user name and password. The user name and password are input necessary for general authentication. It is checked, by comparing the input values in the image forming device 100, whether the user is authorized. If the user is one of the authorized users, various pieces of information about the user are registered to the account management section 117 in the image forming device 100. For example, the user's department, service years, post and other items are registered. Necessary items of the registered user information are also added to the job input information. Moreover, if the image forming device 100 is equipped with a clock (real-time clock) or supports a network protocol for obtaining time from a time server not shown in the figures, the job input time and the like are also added. As described above, the job input information is made up by collecting various items of information concerning the input of the job. In this example, the job input information includes user name, user's department, service years, post, input job type, setting values, and job input time. The input job type indicates a type of the job which the user wants to execute with the image forming device 100; for example, it indicates copying, printing, FAX transmission, or E-mail transmission. If the job type is FAX transmission, the setting values is items of setting information necessary for fax, such as destination FAX number and image quality. FIG. 2 shows an example of job input information when E-mail transmission is selected.

Depending on a command to be processed, the panel instruction recognition section 115 requests a user to provide authentication information through the panel control section 112 and the operation panel 102, in order to confirm authority for executing the command. When the user input the authentication information, the panel instruction recognition section 115 uses the information for authentication and checks the authority. If the authority is checked successfully, the panel instruction recognition section 115 supplies, as an argument, the user identifier input by the user on requesting the processing from the job management section 116. This information is used to judge whether the job management section 116 permits the execution of the job.

If the authentication processing ON/OFF setting value in the setting value management section 132 indicates OFF, the panel instruction recognition section 115 does not perform the authentication.

The job management section 116 receives the jobs requested by the users through the communication instruction recognition section 114 or the panel instruction recognition section 115. Then, the job management section 116 selects processing for executing the received jobs and gives instructions for the executing. Furthermore, the job management section 116 has a function to observe status of the executing and determine the termination. The job management section 116 further receives and processes operation instructions to jobs.

When receiving a job, the job management section 116 performs processing to check whether a user who requests the job has authority to execute the job (or authority checking). If the job can be executed as a result of the authority checking, the job management section 116 adds to the job the user identifier which is checked as the owner of the job. When the job is input from internal processing, such as local printing which starts automatically, the job management section 116 does not check authority for the job and gives instructions to execute it. The job management section 116 observes status with such a degree of fineness as checking whether the job processing is still waiting to be started, as checking whether it has started and is in progress, as checking whether it has started and stopped because of an error, and stuff like that. For the determination of the termination, the job management section 116 determines whether the job has finished successfully or unsuccessfully. When it finished unsuccessfully, the job management section 116 investigates the cause. The job management section 116 manages information about the job and responds to inquiries about status of the job. Instructions concerning jobs other than observation include start, suspend, cancel, resume, and the like, and the job management section 116 has responsibility for responding to requests for these instructions. For any instructions, the job management section 116 checks the owner attached to the job before it is executed: If the user of the instruction is the owner, it is executed; if not, actions such as rejecting the execution is made.

The account management section 117 manages information on the user by using the storage section 140. Authentication processing is executed by checking first authentication information input from the outside with second authentication information registered inside, and the account management section 117 holds the second authentication information in the storage section 140. Any type of user identifier may be used as the second authentication information, as long as it can identify the user. The second authentication information is the user name and password in this embodiment, but it may be a mere numeric value, a fingerprint, or an iris pattern. The account management section 117 also holds information items configuring the job input information in the storage section 140 in association with the second authentication information.

The function management section 118 manages each function executed by the image forming device 100. The function management section 118 has a role to assign functions to the job according to instructions from the job management section 116 and a role to cause the assigned functions to implement the function. More specifically, the function management section 118 causes the function section 120 to execute the processing of the job by assigning, to the job, appropriate functions among from the functions included in the function section 120. While the job management section 116 takes a role to process the job in the unit requested by the user such as ScanToEmail, the function management section 118 manages the scan processing and the E-mail processing separately. Since the separate management makes it possible by combining functions to implement a variety of jobs, the number of functions to be held and managed in the image forming device 100 can be reduced, and consequently the entire control is facilitated. In this embodiment, the following processing is defined as the functions.

The function section 120 executes the functions in the image forming device 100.

The function section 120 includes a scanner function section 121, a FAX function section 122, a media access function section 123, a print function section 124, an E-mail function section 125, and a report preparation function section 126.

The scanner function section 121 scans original documents to generate image data. For example, the scanner function section 121 drives a scanner unit to control scanning the user's original documents. The scanner function section 121 specialized just scan operations and does not change its own operations depending on other functions to be combined. Operation history is managed by the management section 130.

The FAX function section 122 sends and receives image data through a telephone line. For example, the FAX function section 122 controls FAX receiving and FAX sending. More specifically, the FAX function section 122 stores or transfers received image data in or to places specified by the job management section 116 and also sends image data by FAX from places specified by the job management section 116. The FAX function section 122 specializes just FAX operations and does not change its own operations depending on other functions to be combined. Operation history is managed by the management section 130.

The media access function section 123 reads data from portable media and writes data into portable media. For example, the media access function section 123 has a slot through which a portable medium is inserted into the image forming device 100 and operates data in the inserted portable medium. More specifically, the media access function section 123 performs processing to read data and provide them to a subsequent process and to write data provided from a previous process into a portable medium. The media access function section 123 specializes just a portable medium access operations and does not change its own operations depending on other functions to be combined. The portable medium is a storage medium which is not inserted into the image forming device 100 all the time, such as an USB memory, an SD (secure digital) card, and a CompactFlash, and which the user owns and uses to carry data. Operation history is managed by the management section 130.

The print function section 124 is an image forming section which performs printing (image forming). In this embodiment, the print function section 124 functions as a first image forming section which forms one or more visible images included in a plurality of images to be formed on a single page of a medium by using ordinary toner, and as a second image forming section which forms one or more invisible images included in the plurality of images in a non-image-forming area in which the one or more images of the ordinary color is not formed in the medium by using UV toner, on the basis of print data (image formation data) indicating the image to be formed.

Here, it is preferable that the non-image-forming area be, between sides of a medium, the opposite side of the side on which the one or more visible images are formed.

The invisible image is formed on the medium by horizontally inverting the image which is designated to be formed with UV toner in the print data. The horizontal inversion here is performed to be linearly symmetrical with respect to the central line in the right-left (horizontal) direction of a whole print image (medium).

The print data may be received from the outside through the communication section 101 and may also be generated by different function sections such as the report preparation function section 126 and the FAX function section 122.

For example, the print function section 124 controls printing and prints images on the basis of data supplied from the function management section 118. More specifically, the print function section 124 performs operations to fix images actually onto sheets of paper (medium) in the printing process. When the processing is completed, printed sheets of paper are discharged to a paper discharge stacker (not shown in the drawings). The print function section 124 specializes just print operations and does not change its own operations depending on other functions to be combined. Operation history is managed by the management section 130. The print function section 124 will be described later in detail with reference to FIG. 3.

The E-mail function section 125 sends and receives data through networks. For example, the E-mail function section 125 controls sending and receiving E-mails. More specifically, the E-mail function section 125 stores or transfers received image data in or to places specified by the job management section 116 and sends image data in places specified by the job management section 116 by E-mail. The E-mail function section 125 specializes just E-mail operations and does not change its own operations depending on other functions to be combined. Operation history is managed by the management section 130.

The report preparation function section 126 receives the types of local prints to be output, thereby forming print data needed for them. For data needed for the local print, various items of log data managed by the management section 130 are read and used. Since the read items of the log data cannot be printed as they are, the report preparation function section 126 converts them to a printable form and also arranges them so that they can be easy to see.

The management section 130 manages data necessary for the image forming device 100.

The management section 130 includes an authority management section 131, a setting value management section 132, and a log management section 133.

The authority management section 131 determines requests (authority) permitted to an authenticated user, by using the storage section 140. If authentication succeeds, a user identifier for identifying the user is assigned. The authority management section 131 has a role of returning authority given to the user by supplying it with the user identifier. In order to limit usage, the authority management section 131 also has a role of comparing a limit value representing an upper limit and a counter value representing a current value and permitting operations to be continued as long as the counter value does not exceed the limit value. The authority corresponding to the user identifier is stored in the storage section 140.

The setting value management section 132 manages setting values of the image forming device 100 by using the storage section 140. For example, the setting value management section 132 receives demands for reading and changing setting values. Since every process has a possibility of using setting values, the setting value management section 132 may be accessed by every process. The setting value management section 132 has a persistence function and has the storage section 140 store the setting values so that the stored content can be kept even on such an occasion that power is turned on again.

The log management section 133 manages, by using the storage section 140, data to be stored as a log each time a job is executed. The log management section 133 stores ordinary results of job execution, a variety of counter values, and data processed in job execution as the log in the storage section 140. The log management section 133 has a persistence function and has the storage section 140 store data so that the stored content can be kept even on such an occasion that power is turned on again.

The storage section 140 stores data necessary for the image forming device 100 to perform processing. The storage section 140 is, for example, a memory used as a temporary storage destination for received data and also a storage destination for commands to be sent or received. Since every process has a possibility of using the stored data, the storage section 140 may be accessed by every process. The storage section 140 has a persistence function and can store the stored content even on such an occasion that power is turned on again.

Figure 3:
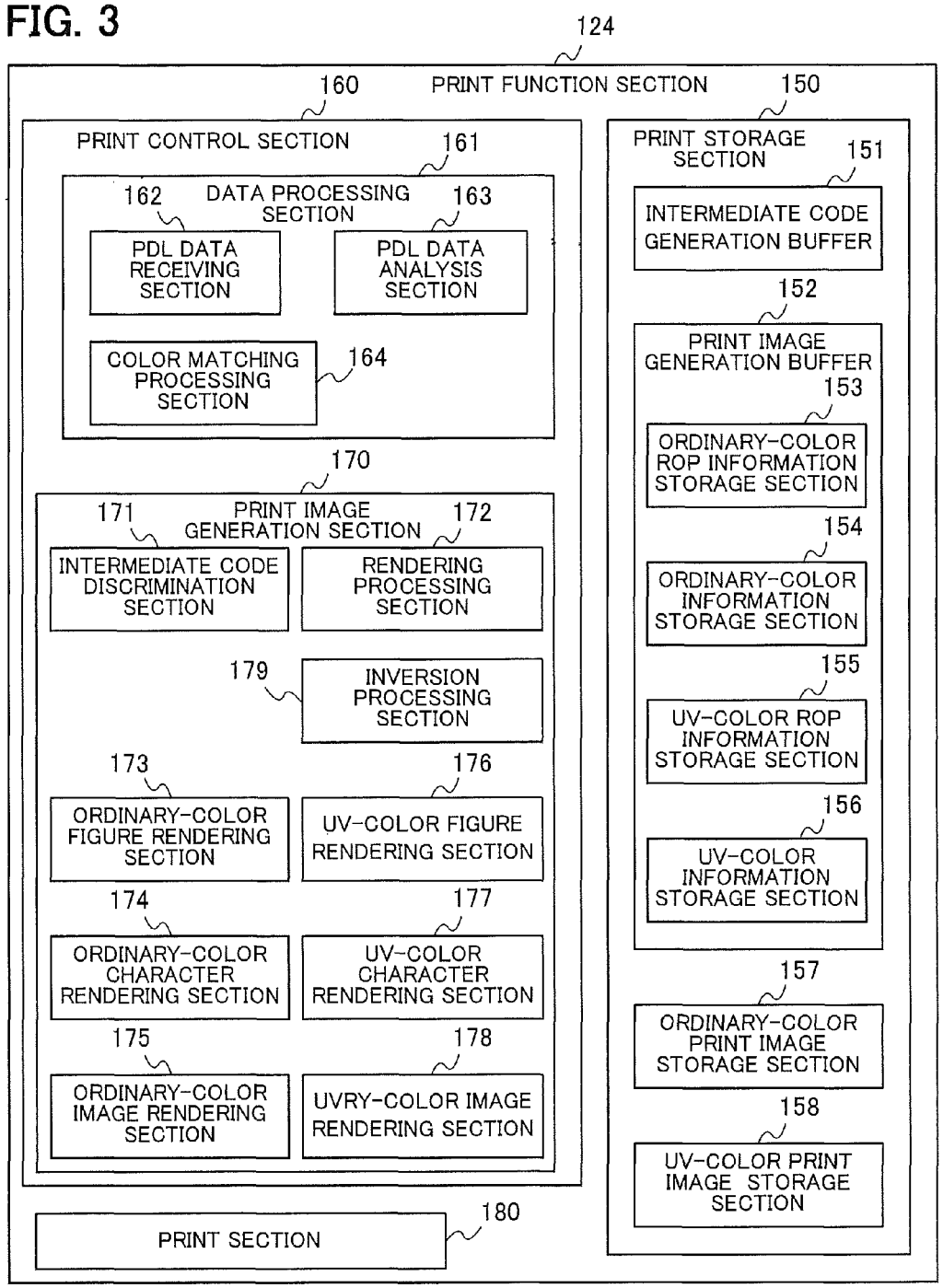
FIG. 3 is a block diagram schematically showing a configuration of a print function section.

FIG. 3 is a block diagram schematically showing a configuration of the print function section 124.

The print function section 124 includes a print storage section 150 which functions as an image formation storage section, a print control section 160 which functions as an image formation control section, and a print section 180 which functions as an image formation execution section.

The print storage section 150 stores data necessary for printing.

The print storage section 150 includes an intermediate code storage section 151, a print image generation buffer 152 which functions as an image formation image generation buffer, an ordinary-color print image storage section 157 which functions as a visible-color image formation image storage section, and a UV-color print image storage section 158 which functions as an invisible-color image formation image storage section.

The intermediate code storage section 151 is a buffer having an area for storing intermediate codes generated by a PDL data analysis section 163.

The print image generation buffer 152 is a buffer for storing information (data) in the process of generating ordinary-color print image data as visible-color image formation image data and UV-color print image data as invisible-color image formation image data.

The print image generation buffer 152 includes an ordinary-color ROP information storage section 153, an ordinary-color information storage section 154, a UV-color ROP information storage section 155, and a UV-color information storage section 156.

The ordinary-color ROP information storage section 153 stores ROP (raster operation) information under generating ordinary-color print image data.

The ordinary-color information storage section 154 stores color information under generating ordinary-color print image data.

The UV-color ROP information storage section 155 stores ROP information under generating UV-color print image data.

The UV-color information storage section 156 stores color information under generating UV-color print image data.

The ordinary-color print image storage section 157 stores ordinary-color print image data.

The UV-color print image storage section 158 stores UV-color print image data.

The print control section 160 controls a print function functioning as an image formation function.

The print control section 160 includes a data processing section 161 and a print image generation section 170 which functions as an image formation image generation section.

The data processing section 161 processes digital data (PDL data) written in a PDL (page description language) as print data. For example, the data processing section 161 processes the PDL data and generates intermediate codes as a display list. The print data include first image information indicating one or more first images to be formed by ordinary toner and second image information indicating one or more second images to be formed by UV toner. The first image and the second image are formed on a single page. The UV toner is developer containing substances which emits light in response to light in a specific frequency domain, which is, for example, invisible light such as ultraviolet light. The ordinary toner is developer which does not contain the substances.

The data processing section 161 includes a PDL data receiving section 162, a PDL data analysis section 163, and a color matching processing section 164.

The PDL data receiving section 162 receives PDL data to be processed by the print function section 124. For example, the PDL data receiving section 162 receives the PDL data received by the communication section 101.

The PDL data analysis section 163 analyzes the PDL data and generates a display list according to instructions of the PDL data. The display list is a data format expressing an intermediate state for generating rendering images by interpreting the PDL and is referred to here as intermediate codes. The PDL data analysis section 163 stores the generated intermediate codes in the intermediate code storage section 151.

The color matching processing section 164 converts the standard color representation written in a PDL into color information in accordance with the capability of the apparatus, so that, when each apparatus executes printing, the difference caused by the color representation capability characteristic of each apparatus will not appear in print results.

The print image generation section 170 generates print image data as image formation image data indicating print images (image formation images) to be formed on the medium, from the intermediate code generated by the data processing section 161. In this embodiment, the print image data are made up of ordinary-color print image data and UV-color print image data.

The print image generation section 170 includes an intermediate code discrimination section 171, a rendering processing section 172, an ordinary-color figure rendering section 173, an ordinary-color character rendering section 174, an ordinary-color image rendering section 175, a UV-color figure rendering section 176, a UV-color character rendering section 177, a UV-color image rendering section 178, and an inversion processing section 179.

The intermediate code discrimination section 171 reads intermediate codes from the intermediate code storage section 151 and sets the color information and the discrimination among figure, character, and picture image in the rendering processing section 172.

The rendering processing section 172 renders print images from the intermediate codes generated by the PDL data analysis section 163 and generates print image data. The actual processing is transferred to different processing, but the rendering processing section 172 has responsibility for the completion of the print image data and makes a final judgment of whether it has succeeded or failed. The transfer destinations are the ordinary-color figure rendering section 173, the ordinary-color character rendering section 174, the ordinary-color image rendering section 175, the UV-color figure rendering section 176, the UV-color character rendering section 177, or the UV-color image rendering section 178.

The ordinary-color figure rendering section 173 generates rendering data according to figure rendering instructions designating ordinary-color written in a PDL. Information under generating is stored in the ordinary-color ROP information storage section 153 and the ordinary-color information storage section 154. The generated results are stored in the ordinary-color print image storage section 157.

The ordinary-color character rendering section 174 generates rendering data according to character rendering instructions designating ordinary-color written in a PDL. Information under generating is stored in the ordinary-color ROP information storage section 153 and the ordinary-color information storage section 154. The creation results are stored in the ordinary-color print image storage section 157.

The ordinary-color image rendering section 175 generates rendering data according to picture rendering instructions designating ordinary-color written in a PDL. Information under generating is stored in the ordinary-color ROP information storage section 153 and the ordinary-color information storage section 154. The generated results are stored in the ordinary-color print image storage section 157.

The UV-color figure rendering section 176 generates rendering data according to figure rendering instructions designating UV-color written in a PDL. Information under generating is stored in the UV-color ROP information storage section 155 and the UV-color information storage section 156. The generated results are stored in the UV-color print image storage section 158.

The UV-color character rendering section 177 generates rendering data according to character rendering instructions designating UV-color written in a PDL. Information under generating is stored in the UV-color ROP information storage section 155 and the UV-color information storage section 156. The generated results are stored in the UV-color print image storage section 158.

The UV-color image rendering section 178 generates rendering data according to picture rendering instructions designating UV-color written in a PDL. Information under generating is stored in the UV-color ROP information storage section 155 and the UV-color information storage section 156. The generated results are stored in the UV-color print image storage section 158.

The inversion processing section 179 generates inverted rendering data by horizontally inverting a partial print image (partial image formation image) included in the rendering data received from the UV-color figure rendering section 176, the UV-color character rendering section 177, or the UV-color image rendering section 178 and returns the inverted rendering data to the request source.

The print section 180 receives print image data and executes printing (image forming). Input data are received from the ordinary-color print image storage section 157 and the UV-color print image storage section 158. The print section 180 forms ordinary-color images on the basis of ordinary-color print image data received from the ordinary-color print image storage section 157 and generates UV-color images on the basis of UV-color print image data received from the UV-color print image storage section 158.

Figure 4A:
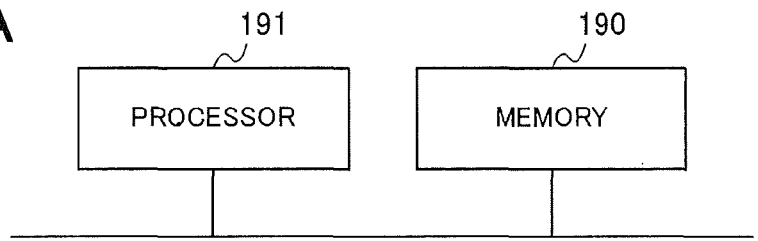
FIGS. 4A and 4B are schematic diagrams showing partial hardware configurations of an image forming device 100.

The control section 110, part of the function section 120, the management section 130 and the storage section 140 (see FIG. 1), and the print storage section 150 and the print control section 160 (see FIG. 3) are implemented by a memory 190 and a processor 191 such as a CPU (central processing unit) which executes programs stored in the memory 190, as shown in FIG. 4A. The programs may be supplied through networks and also can be recorded on recording media and provided in that form.

Figure 4B:
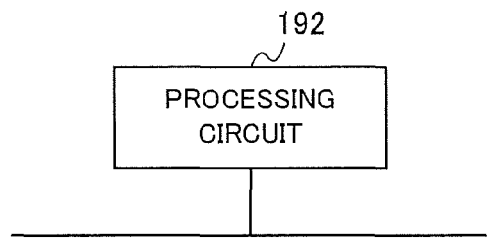

All or part of them can also be implemented by a processing circuit 192 such as a single circuit, a combined circuit, a programmed processor, a parallel-programmed processor, an ASIC (application-specific integrated circuit), or an FPGA (field programmable gate array), as shown in FIG. 4B.

Figure 5:
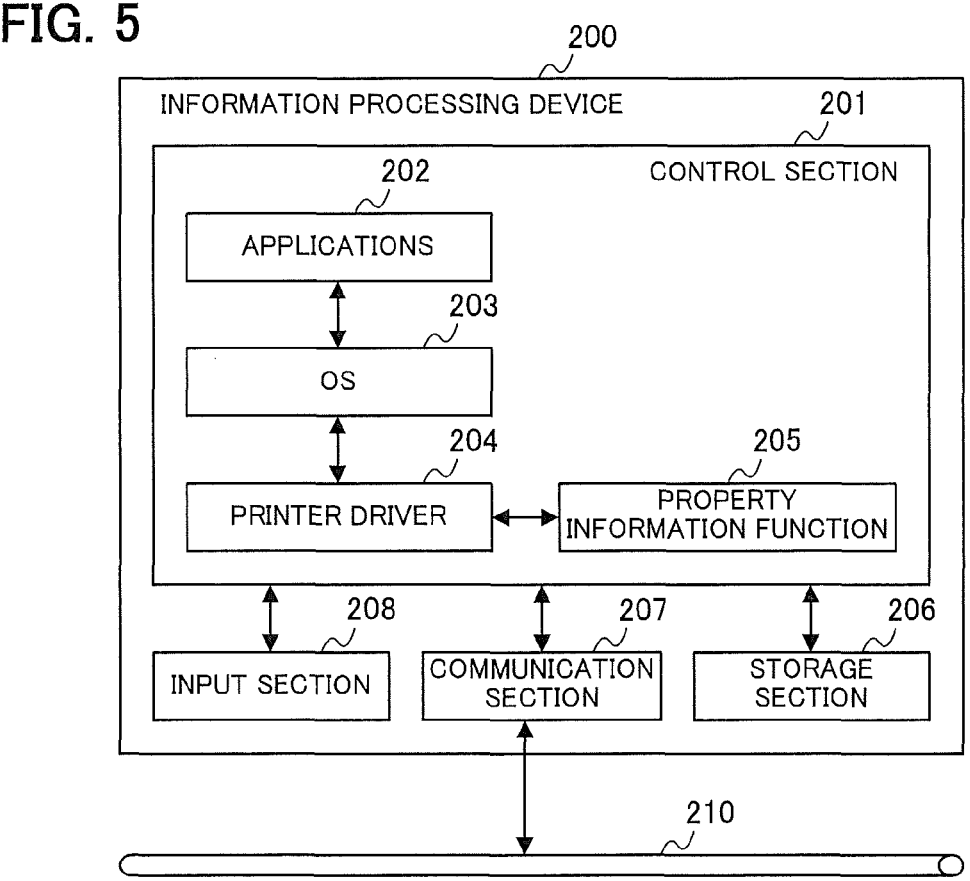
FIG. 5 is a block diagram schematically showing a configuration of an information processing device.

FIG. 5 is a block diagram schematically showing a configuration of an information processing device 200, which sends jobs to the image forming device 100.

The information processing device 200 includes a control section 201, a storage section 206, a communication section 207, and an input section 208.

The control section 201 controls processing in the information processing device 200.

For example, the control section 201 executes applications 202, an OS 203, a printer driver 204, and a property information adding function 205.

The applications 202 are software specialized to achieve aims which is generated to satisfy various kinds of demands in really wide genres. In this embodiment, one of the applications 202 is assumed to be software for generating documents, for example.

The OS 203 is an operating system.

The printer driver 204 is a device driver registered in the OS 203 and managed by the OS 203. The printer driver 204 interprets format information of documents generated by the applications 202 and converts them into a PDL. The converted PDL data are sent to the image forming device 100.

The property information adding function 205 makes property information associated with specific tags and sends it as tag information to the image forming device 100. Property input fields are prepared for each of the applications 202 and users can input or change the property information through the fields. The property information indicates a creator, a company name, a creation date, and the like, and free description is permitted in note fields. Since free description is permitted, the revision history or the like may also be described.

The storage section 206 stores information necessary for processing in the information processing device 200.

The communication section 207 sends and receives data to and from a network 210.

The input section 208 accepts operation input.

The information processing device 200 can be implemented, for example, by a general computer including a CPU, a memory, an external storage such as an HDD, an input device such as a keyboard or a mouse, an output device such as a display, and a communication device such as an NIC (network interface card) for connecting a communication network.

For example, the control section 201 can be implemented by loading a program stored in the external storage into the memory and executing it by the CPU; the storage section 206 can be implemented by the use of the memory or external storage by the CPU; the communication section 207 can be implemented by the use of the communication device by the CPU. The input section 208 can be implemented by the use of the input device by the CPU.

Outlines of the embodiment will be explained with reference to FIGS. 6A to 6D.

Figure 6A:
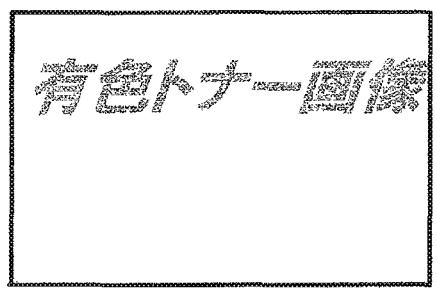
FIGS. 6A, 6B, 6C and 6D are schematic diagrams for illustrating an example of processing in the image forming device.

FIG. 6A is a schematic diagram showing an example of an image printed on the front face of a medium with ordinary toner.

Figure 6D:
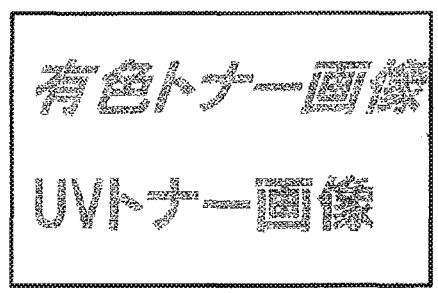
Figure 6B:
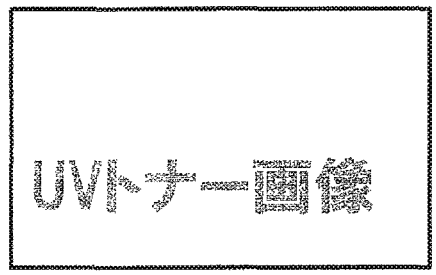

FIG. 6B is a schematic diagram showing an example of an image printed on the front face of a medium with UV toner, in accordance with the PDL data. The data processing section 161 generates intermediate codes with which the image as shown in FIG. 6B are printed from the PDL data received by the communication section 101, and stores them in the intermediate code storage section 151.

Incidentally, the PDL data are assumed to specify that the image shown in FIG. 6A and the image shown in FIG. 6B are printed on the same page.

Figure 6C:
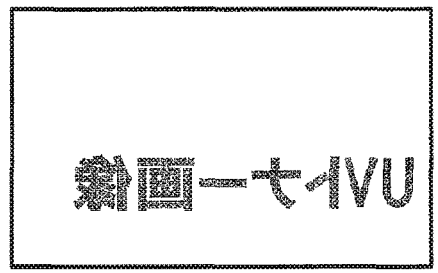

FIG. 6C is a schematic diagram showing an example of an image printed on the back face of a medium with UV toner. In this embodiment, UV-color print image data for printing the image shown in FIG. 6C are generated by horizontally inverting the image shown in FIG. 6B. More specifically, the print image generation section 170 generates the UV-color print image data for generating the image shown in FIG. 6C from the intermediate codes indicating the image as shown in FIG. 6B.

FIG. 6D is a schematic diagram showing an example of print results by the image forming device 100 according to the embodiment. The characters 有色トナー画像 shown in FIG. 6A are printed on the front face of a medium, and the inverted characters of UV トナー画像 shown in FIG. 6C are printed on the back face of the medium. When ultraviolet light is thrown from the front face to the printed matter printed in this way above, the image printed with UV toner can be seen through the sheet of paper, and the users can see the images as shown in FIG. 6D from the front face of the medium.

The print image generation section 170 inverts the image formed with UV toner so that it becomes linearly symmetrical with respect to the central line in the horizontal direction of the print image, as shown in FIG. 6C. Therefore, when the users see the image printed on the back face of the medium from the front face of the medium, the image printed on the back face of the medium can be seen as shown in FIG. 6D, in the same position as the image shown in FIG. 6B.

Operation of the outlines described with reference to FIGS. 6A to 6D will be explained below.

Figure 7:
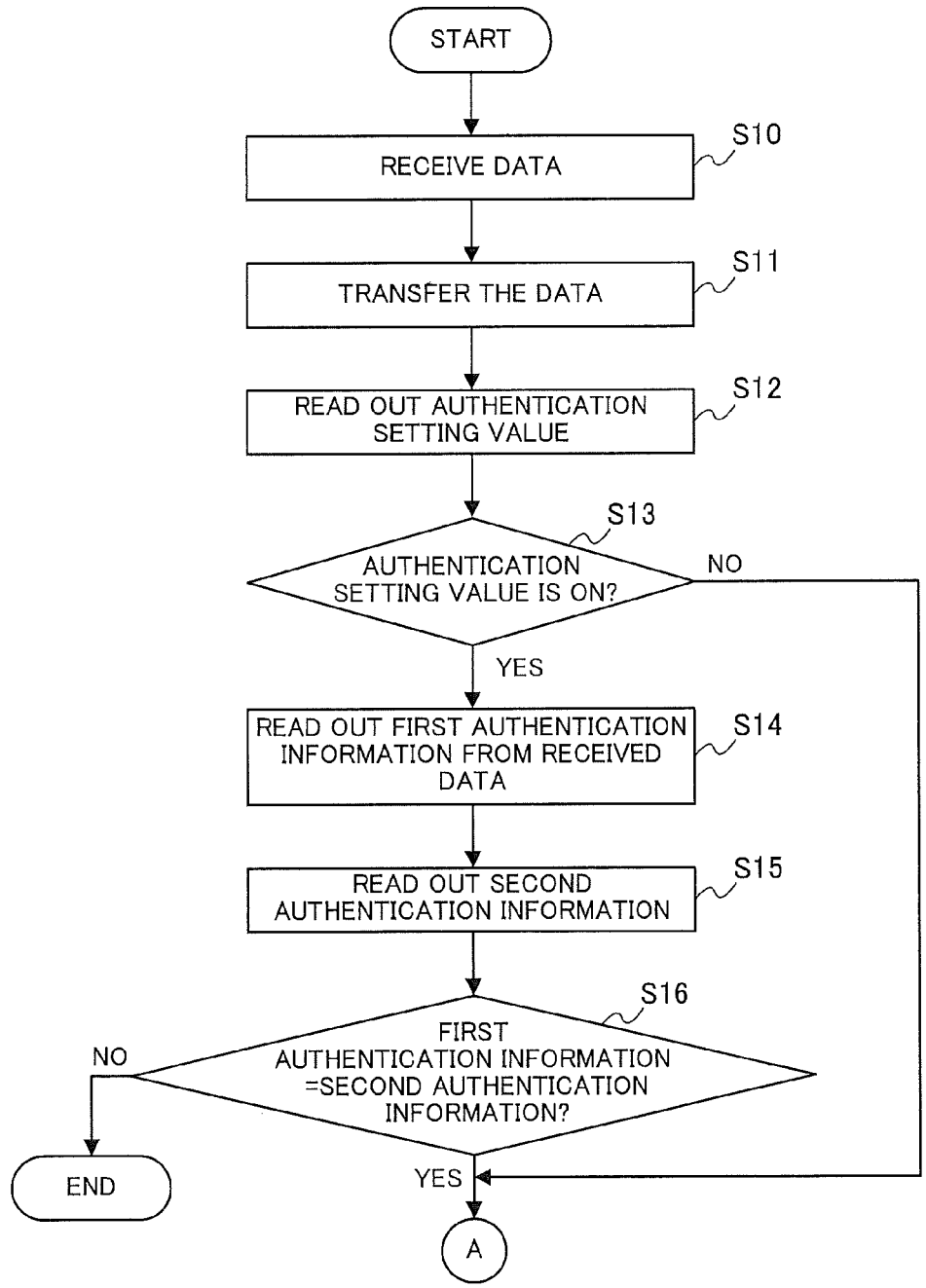
FIG. 7 is a first part of a flowchart illustrating a basic operation of the image forming device when a job is executed.
Figure 8:
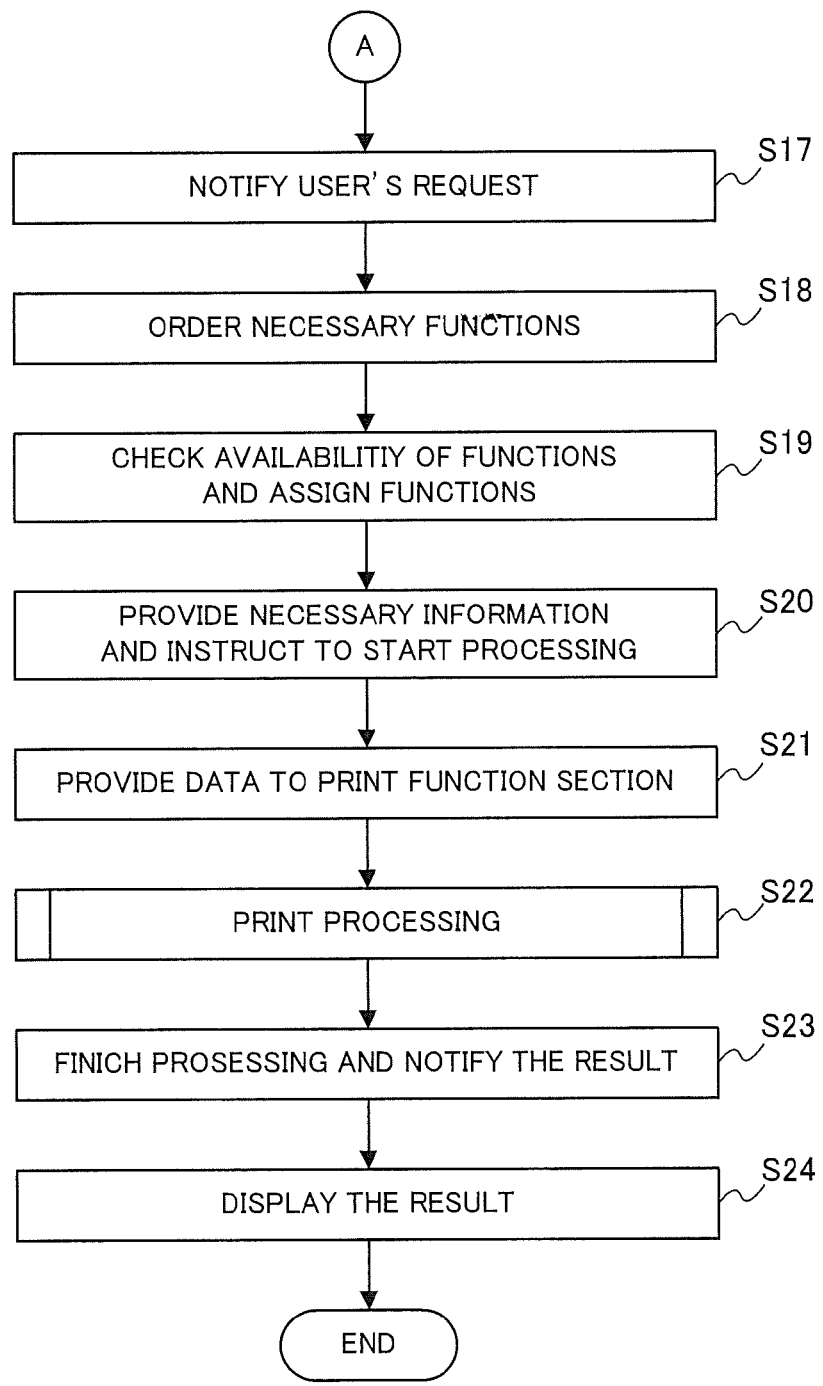
FIG. 8 is a second part of the flowchart illustrating the basic operation of the image forming device when the job is executed.

FIG. 7 and FIG. 8 are flowcharts illustrating the basic operation of the image forming device 100 when it executes a job.

Here an example in which a user has the image forming device 100 execute a print job, in other words, a FAX communication management report print function, will be described.

The communication section 101 receives data (S10).

There are roughly two means by which users inputs processing commands to the image forming device 100. The first means is to input commands from PCs such as the information processing device 200 through communication media such as networks or USB cables. Specific examples are to give instructions from the PCs to perform normal printing with use of printer drivers, to give instructions from the PCs to change setting values with use of utilities, or to give instructions from the PCs to observe statuses with use of WEB pages. The second means is to input instructions from the operation panel 102. A Specific example is to give instructions to perform copying, scanning and sending E-mail, scanning and transferring a file to an external server, sending FAX, or the like.

By the first means, a print-from-PC function to be described here is assumed to be input. In other words, the communication section 101 receives data from an external PC and gives the received data to the communication control section 111.

The communication control section 111 transfers a request included in the received data to the communication instruction recognition section 114 (S11). What is transferred here is a requirement of print-from-PC. In the processing, print-from-PC is identified by a request identifier of PCPrint.

The communication instruction recognition section 114 reads an authentication setting value from the setting value management section 132 (S12). The authentication setting value is a setting value for determining whether authentication is carried out or not. These days, the running costs of consumables used up by the print section 180 of the image forming device 100 are not that low, therefore the number of the users who can use it may be restricted because of the cost. Since the image forming device 100 is equipped with an information transfer function such as E-mail transmission or FAX transmission, or a copy function of original documents, the users who can use it may be restricted also in order to prevent information from leaking. In those cases, authentication is performed to restrict the users who can use it.

Although Users can set the authentication setting value, a role called an administrator is defined generally, so just the administrator has authority to change the setting value. The authority is gained by the administrator's special account.

The communication instruction recognition section 114 checks the authentication setting value to see whether it is sets in performing authentication (S13). If it is sets in performing authentication (YES in S13), the process proceeds to step S14. If it is sets in not performing authentication (NO in S13), the process proceeds to step S17 in FIG. 8.

In step S14, the communication instruction recognition section 114 reads first authentication information from the received data. The first authentication information is information for identifying the user who has input the request. Specifically, although there are the above-mentioned types of information for the first authentication information, here this embodiment is described by using, for example, a user name and a password. The user name and the password are handled as a pair. The user name is an open value, and the password is a secret value. Since the user name is a user identifier, overlapping registration of the same user name is not permitted, but overlapping registration of the same password is permitted.

The communication instruction recognition section 114 reads from the account management section 117 second authentication information which is already registered (S15). Since authentication processing is performed by comparing the registered second authentication information with the first authentication information input together with the request when the request is input, it is necessary to have registered the second authentication information for identifying the user who would be permitted to use the image forming device 100. The type of the second authentication information is the same as that of the first authentication information, but they have different significances from each other. For example, if the first authentication information is likened to an answer written by a student, the second authentication information would be a model answer sheet with the correct answer.

The communication instruction recognition section 114 checks whether the first authentication information corresponds to the second authentication information (S16). Here, if the first authentication information agrees with the second authentication information, the communication instruction recognition section 114 decides that the first authentication information corresponds to the second authentication information.

If the first authentication information corresponds to the second authentication information (YES in S16), the authentication succeeds, and the processing proceeds to step S17 in FIG. 8.

If the first authentication information does not correspond to the second authentication information (NO in S16), the authentication fails, and the processing ends. In other words, the user who has input the request is not recognized as a registered user, and the input request is rejected.

In step S17 in FIG. 8, the panel instruction recognition section 115 notifies the job management section 116 of the user's request. The panel instruction recognition section 115 causes the operation panel 102 to display an interface (I/F) in a user-friendly menu form and recognizes a request input there. The panel instruction recognition section 115 converts the recognized request to a job reception I/F offered by the job management section 116 and requests the job management section 116 to perform the processing. Here, an example in which the panel instruction recognition section 115 requests processing a job of printing a FAX communication management report will be described.

The job management section 116 orders the function management section 118 to assign functions necessary for executing the request of which the panel instruction recognition section 115 notifies it (S18).

For example, the job management section 116 recognizes the processing of printing a FAX communication management report, which is the request, as a job in an internal expression form of ReporttoPrint. And then, the job management section 116 reads out, from the internal information, processing to form a report and processing to perform printing as the functions necessary for the recognized job. The job management section 116 manages the request, considering time at which the request is processed and completed in the image forming device 100. The job management section 116 inquires of the function management section 118 functions necessary for executing the managed job of printing a FAX communication management report.

The function management section 118 checks the availability of the requested functions and assigns them to the requested job if possible (S19). Here, the function management section 118 assigns the report preparation function section 126 and the print function section 124. If the print function section 124 is busy at that time, the function management section 118 assigns the function to the requested job as soon as the processing of the print function section 124 ends. The function management section 118 couples the assigned report preparation function section 126 and print function section 124 together in accordance with the data processing order. For the job of printing a FAX communication management report, the function management section 118 couples the report preparation function section 126 and the print function section 124 in that order. The order for coupling depends on the instruction given from the job management section 116.

The function management section 118 provides the assigned report preparation function section 126 and print function section 124 which are assigned with information necessary for executing the requested job and then gives them instructions to start processing (S20). When the user inputs the request, a request to print a report, a FAX communication history, and a print option, and the like are input, as described above. Among the input information, information items related to the report preparation function section 126 are provided for the report preparation function section 126, and information items related to the print function section 124 are provided for the print function section 124. An information item of which report to be printed is information necessary for operation of the report preparation function section 126. Therefore, an I/F necessary for starting the report preparation function section 126 is designed to require the information. Instructions for print options are information necessary for the print function section 124. Therefore, an I/F necessary for starting the print function section 124 is designed to require the information.

The report preparation function section 126 performs the processing, generates the PDL data of the FAX communication management report, and provides the generated PDL data to the function management section 118. The function management section 118 supplies the PDL data provided from the report preparation function section 126 to the print function section 124 (S21). This sequence depends on the order of coupling functions described earlier. Since the same operation is needed for each job of copying, E-mail, or FAX, the data provided from the preceding function are supplied to the following function simply without doing special process for each job.

The print function section 124 executes the printing of the provided PDL data (S22). The processing here will be described in detail with reference to FIG. 9 and FIG. 10.

The print function section 124 finishes the print processing and reports the result to the function management section 118 (S23). The subsequent sequence is the operation for reporting the completion of the processing to the management section (job management section 116) and for displaying it on the operation panel 102 operated by the user.

The function management section 118 reports the result to the job management section 116; the job management section 116 reports the result to the panel instruction recognition section 115; and the panel instruction recognition section 115 displays the result on the operation panel 102 through the panel control section 112 (S24).

Figure 9:
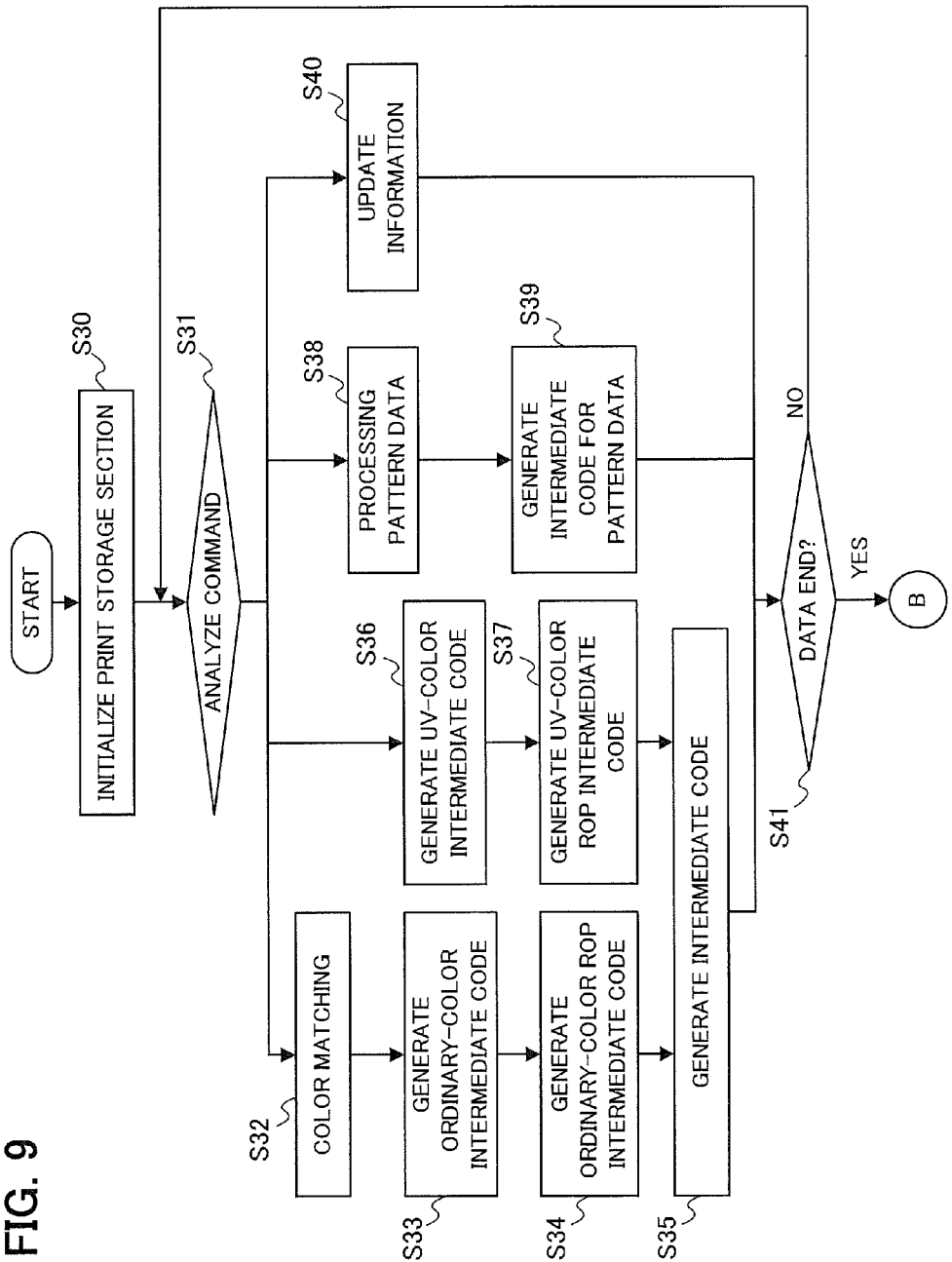
FIG. 9 is a first part of a flowchart illustrating an operation of the print function section.
Figure 10:
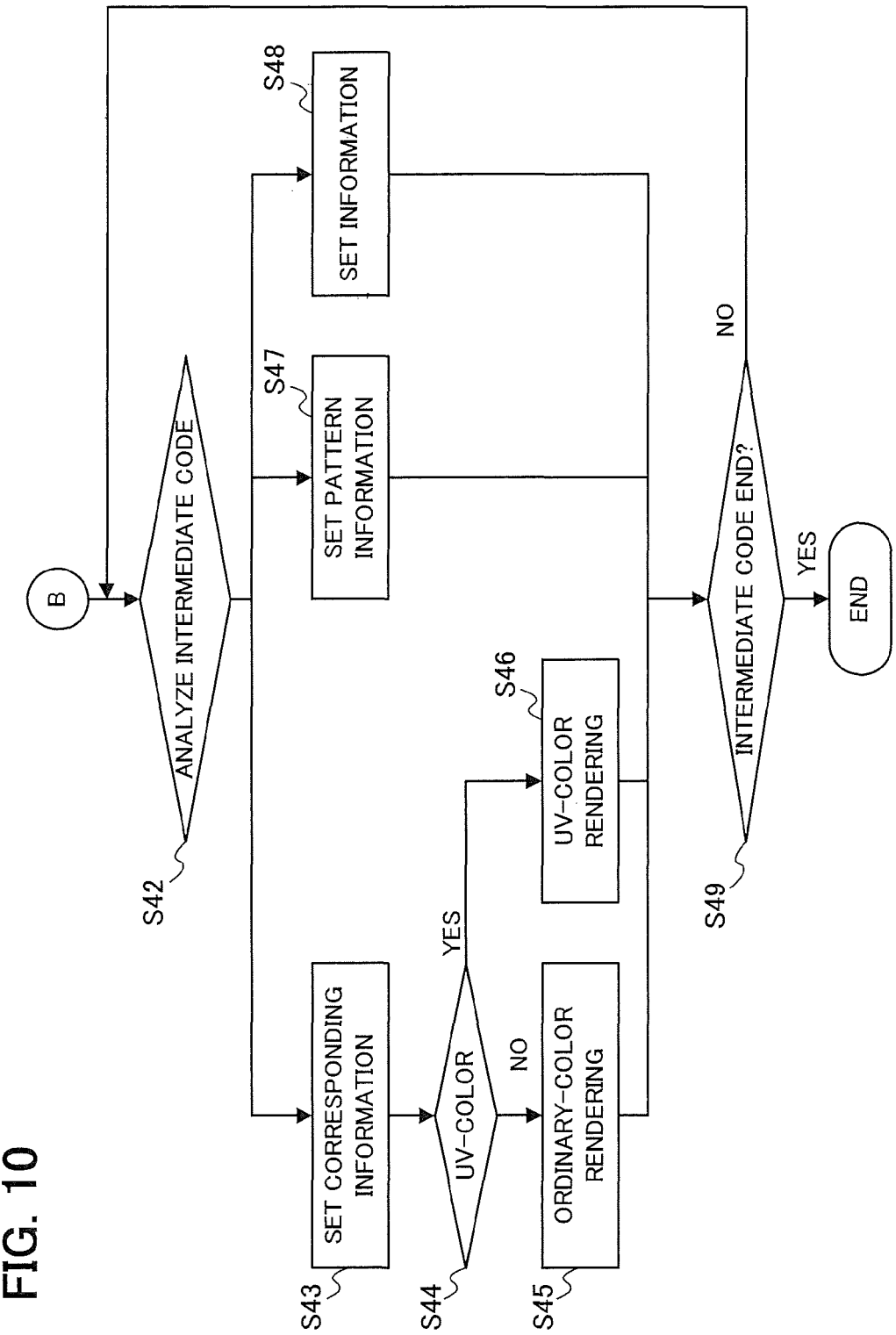
FIG. 10 is a second part of the flowchart illustrating the operation of the print function section.

FIG. 9 and FIG. 10 are flowcharts illustrating the operation (print processing) of the print function section 124.

FIG. 9 shows the processing of analyzing the PDL data (processing by the data processing section 161).

The PDL data analysis section 163 first initializes buffer areas (S30). The following are initialized sequentially: the intermediate code storage section 151, which is a buffer management section for sharing information between the PDL data analysis section 163 and the rendering processing section 172; the ordinary-color print image storage section 157 and the UV-color print image storage section 158, which are buffer management sections for sharing information between the rendering processing section 172 and the print section 180; the ordinary-color ROP information storage section 153 and the ordinary-color information storage section 154, which are used as work areas of the ordinary-color figure rendering section 173, the ordinary-color character rendering section 174, and the ordinary-color image rendering section 175; and the UV-color ROP information storage section 155 and the UV-color information storage section 156, which are used as work areas of the UV-color figure rendering section 176, the UV-color character rendering section 177, and the UV-color image rendering section 178.

The PDL data analysis section 163 sequentially analyzes each of the commands of the PDL data that the PDL data receiving section 162 has received from the function management section 118 (S31). If the received data are not PDL data (including data to be printed), the PDL data analysis section 163 receives and discards the data. The PDL data analysis section 163 classifies the commands of the received PDL data as follows by their content and performs corresponding processing.

The PDL data analysis section 163 usually identifies from the PDL data, instructions to print an ordinary-color (RGB color expressing the visible light area) figure, character, or picture image, an UV-color figure, character, or picture image, a pattern, and the like and instructions to modify table data (color information and ROP information) used in printing.

In this embodiment, in addition to the above, the PDL data analysis section 163 adds a function by which, when a specific tag is detected, printing processing is changed to switching a print mode to duplex printing, inverting horizontally information sent with the specific tag and printing the inverted information on the back face of a medium with UV toner instead of ordinary printing. If a format of part to be printed with the UV toner is specified, the PDL data analysis section 163 follows the specification. If it is not specified, the PDL data analysis section 163 may specify a format (position) of the part to be printed with the UV toner, in accordance with predetermined settings such as top right, top left, bottom right, or bottom left, or may specify those settings as selected by users.

In step S31, if the command is an ordinary-color print command, it is necessary to perform color matching, therefore the PDL data analysis section 163 requests the color matching processing section 164 to perform color matching (S32). Since the color matching processing is widely known, detailed description of the processing is omitted here. If unusually the apparatus or toner has features peculiar to the UV color, color matching is performed. However, if the command is a UV-color print command, color space conversion to YMCK is not performed. Then, the processing proceeds to step S33.

In step S33, the PDL data analysis section 163 interprets the PDL command and generates an ordinary-color intermediate code (display list) for each of the figure, character, and picture image. The generated intermediate codes are stored in the intermediate code storage section 151. Then, the processing proceeds to step S34.

In step S34, the PDL data analysis section 163 interprets the PDL command and generates an ordinary-color ROP intermediate code (display list) for each of the figure, character, and picture image. The generated intermediate codes are stored in the intermediate code storage section 151. Then, the processing proceeds to step S35.

In step S35, the PDL data analysis section 163 generates an intermediate code expressing each of the figure, character, and picture image, considering the color information and the ROP information. The generated intermediate code is stored in the intermediate code storage section 151. Then, the processing proceeds to step S41.

In step S31, if the command is a UV-color print command, the PDL data analysis section 163 interprets the PDL command and generates a UV-color intermediate code (display list) for each of the figure, character, and picture image (S36). The generated intermediate codes are stored in the intermediate code storage section 151. Then, the processing proceeds to step S37.

In step S37, the PDL data analysis section 163 interprets the PDL command and generates a UV-color ROP intermediate code (display list) for each of the figure, character, and picture image. The generated intermediate codes are stored in the intermediate code storage section 151. Then, the processing proceeds to step S35, which has been described above.

In step S31, if the command is a pattern print command, the PDL data analysis section 163 identifies specified pattern data (S38). Then, the processing proceeds to step S39.

In step S39, the PDL data analysis section 163 generates an intermediate code in accordance with the pattern data. The generated intermediate code is stored in the intermediate code storage section 151. Then, the processing proceeds to step S41.

In step S31, if the command is a table data modification command, the PDL data analysis section 163 updates information (S40). Then, the processing proceeds to step S41.

For example, the PDL data analysis section 163 updates the following information.

If the command indicates a change in ordinary-color information, the PDL data analysis section 163 updates the color information used in the processing in step S33.

If the command indicates a change in ordinary-color ROP information, the PDL data analysis section 163 updates the ROP information used in the processing in step S34.

If the command indicates a change in UV-color information, the PDL data analysis section 163 updates the color information used in the processing in step S36.

If the command indicates a change in UV-color ROP information, the PDL data analysis section 163 updates the ROP information used in the processing in step S37.

In step S41, the PDL data analysis section 163 checks the PDL data to see whether there is a next command. If there is a next command (NO in S41), the processing returns to step S31; if there is not a next command (YES in S41), the processing proceeds to step S42 in FIG. 10.

FIG. 10 illustrates the processing of rendering and printing (processing of the print image generation section 170).

In step S42 in FIG. 10, the intermediate code discrimination section 171 reads each intermediate code sequentially from the intermediate code storage section 151 and assigns processing in accordance with the read intermediate code. The intermediate code discrimination section 171 usually identifies instructions to render an ordinary-color (RGB color expressing the visible light area) figure, character, or picture image, a UV-color figure, character, or picture image, a pattern, and the like, and instructions to modify the table data (color information and ROP information) used in printing.

The rendering processing section 172 transfers processing to the ordinary-color figure rendering section 173 if the intermediate code is an ordinary-color figure print instruction, to the ordinary-color character rendering section 174 if the intermediate code is an ordinary-color character print instruction, or to the ordinary-color image rendering section 175 if the intermediate code is an ordinary-color picture image print instruction. The rendering processing section 172 transfers processing to the UV-color figure rendering section 176 if the intermediate code is a UV-color figure print instruction, to the UV-color character rendering section 177 if the intermediate code is a UV-color character print instruction, or to the UV-color image rendering section 178 if the intermediate code is a UV-color picture image print instruction.

As for the instructions to modify the table data to be used in the corresponding rendering process, if the information is ordinary color, the rendering processing section 172 transfers processing to the ordinary-color figure rendering section 173 if the target is a figure, or to the ordinary-color character rendering section 174 if the target is a character. Likewise, when the information is UV color, the rendering processing section 172 transfers the processing to the UV-color figure rendering section 176 if the target is a figure or to the UV-color character rendering section 177 if the target is a character.

In step S42, if the intermediate code is an ordinary-color or UV-color print instruction, the intermediate code discrimination section 171 sets the color information and the distinction among figure, character, and picture image to the rendering processing section 172 (S43). Then, the processing proceeds to step S44.

In step S44, the rendering processing section 172 checks the set color information and determines whether the set color information is the UV color. If the set color information is the ordinary color (NO in S44), the processing proceeds to step S45; if the specified color information is the UV color (YES in S44), the processing proceeds to step S46.

In step S45, the rendering processing section 172 requests the ordinary-color figure rendering section 173 to execute ordinary-color figure rendering if the image is a figure, the ordinary-color character rendering section 174 to execute ordinary-color character rendering if the image is a character, and the ordinary-color image rendering section 175 to execute ordinary-color picture image rendering if the image is a picture. If the ordinary-color print image data under generation are not stored in the ordinary-color print image storage section 157, the ordinary-color figure rendering section 173, the ordinary-color character rendering section 174, and the ordinary-color image rendering section 175 generate initial data of the ordinary-color print image data and add the rendering data generated by each. Then, the processing proceeds to step S49.

In step S46, the rendering processing section 172 requests the UV-color figure rendering section 176 to execute UV-color figure rendering if the image is a figure, the UV-color character rendering section 177 to execute UV-color character rendering if the image is a character, and the UV-color image rendering section 178 to execute UV-color picture image rendering if the image is a picture. In actual rendering, the inversion processing section 179 described earlier is used to render horizontally inverted images. For example, the UV-color figure rendering section 176 renders the figure from the intermediate code and supplies rendering data indicating the rendered figure to the inversion processing section 179. The inversion processing section 179 generates inverted rendering data by horizontally inverting the figure indicated by the supplied rendering data and provides them to the UV-color figure rendering section 176. The UV-color figure rendering section 176 places the figure indicated by the inverted rendering data on the given UV-color print image so that it becomes linearly symmetrical with respect to the central line in the horizontal direction of the given UV-color print image. The UV-color character rendering section 177 or the UV-color image rendering section 178 performs the same processing for the character or picture image. If the UV-color print image data under generation are not stored in the UV-color print image storage section 158, the UV-color figure rendering section 176, the UV-color character rendering section 177, and the UV-color image rendering section 178 generate initial data of the UV-color print image data and add the rendering data generated by each. Then, the processing proceeds to step S49.

In step S41, if the intermediate code is a pattern print instruction, the intermediate code discrimination section 171 registers the pattern information to the rendering processing section 172 (S47). In the intermediate code, color information, ROP information, and the target to be rendered are usually described in combination. The processing of step S47 is performed when the information is specified alone, and such processing is not required usually.

In step S41, if the intermediate code is a table data modification instruction, the intermediate code discrimination section 171 registers that type of modification to the rendering processing section 172 (S48). In the intermediate code, color information, ROP information, and the target to be rendered are usually described in combination. The processing of step S48 is performed when the information is specified alone, and such processing is not required usually. For example, the intermediate code discrimination section 171 registers the following information to the rendering processing section 172.

If the rendering target read from the intermediate code is ordinary-color information, the intermediate code discrimination section 171 registers it to the rendering processing section 172.

If the rendering target read from the intermediate code is ordinary-color ROP information, the intermediate code discrimination section 171 registers it to the rendering processing section 172.

If the rendering target read from the intermediate code is UV-color information, the intermediate code discrimination section 171 registers it to the rendering processing section 172.

If the rendering target read from the intermediate code is UV-color ROP information, the intermediate code discrimination section 171 registers it to the rendering processing section 172.

Then, the processing proceeds to step S49.

In step S49, the intermediate code discrimination section 171 checks whether there is a next intermediate code. If there is a next intermediate code (NO in S49), the processing returns to step S42; if there is not a next intermediate code (YES in S49), the processing ends.

The ordinary-color print image and UV-color print image generated as described above are printed by the print section 180. For example, the ordinary-color print image is printed on the front face of a sheet of paper as the medium, and the UV-color print image is printed on the back face of the sheet of paper as the medium.

Figure 11:
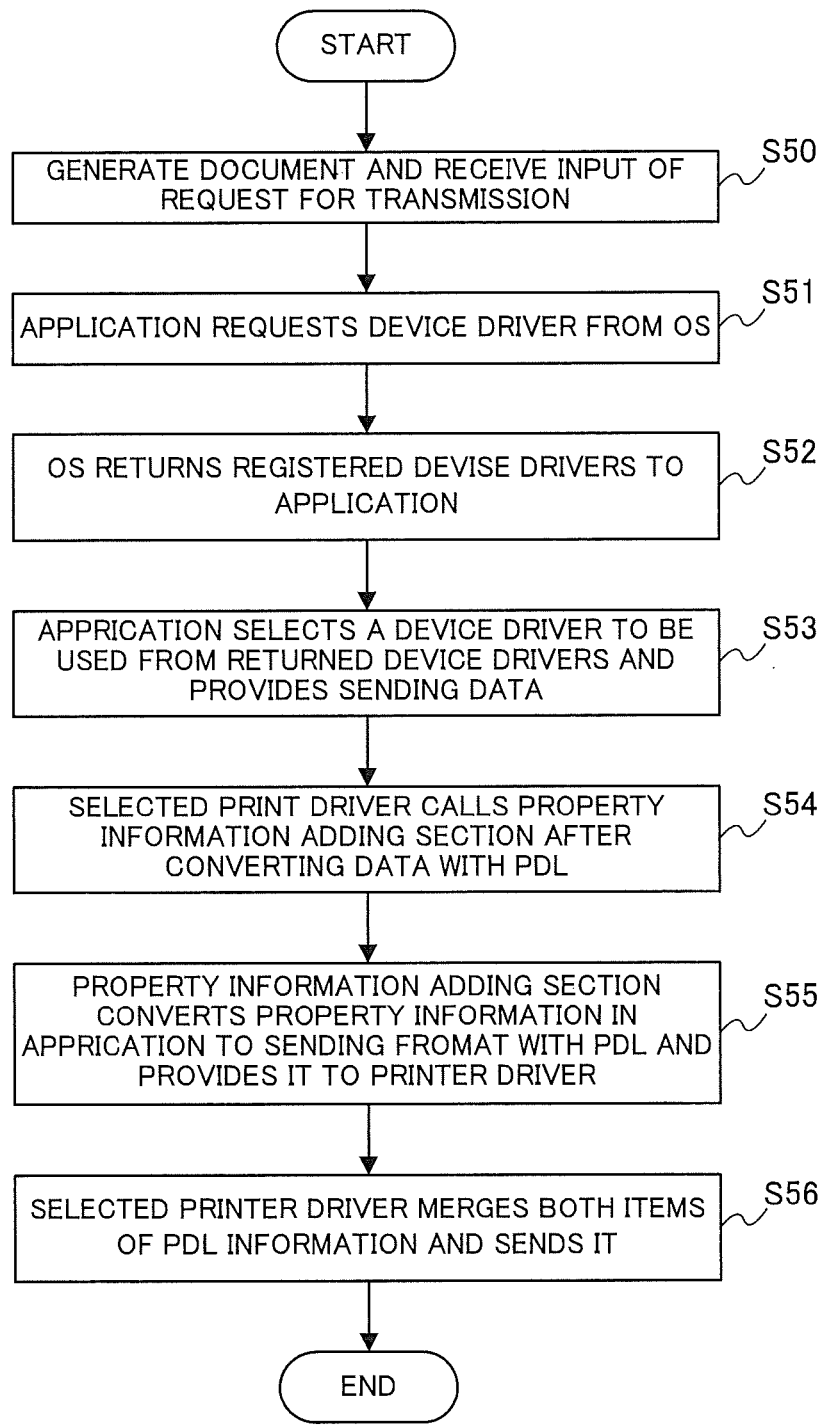
FIG. 11 is a flowchart illustrating an operation of the information processing device when a job is input on a host side.

FIG. 11 is a flowchart illustrating the operation of the information processing device 200 when a job is input on the host side.

The user operates the input section 208 of the information processing device 200 as the host terminal to request the image forming device 100 to execute a job.

The user generates a document by operating the input section 208 and using the applications 202. Then, the input section 208 accepts a request for transmission to the image forming device 100 (S50). The applications 202 have a function to input and edit text characters and also a DTP (desktop publishing) function to place image data and the like in a document. The user generates a document to be sent finally by using those functions. The generated document is sent to the image forming device 100 through a network, a USB, or the like.

The applications 202 request a device driver from the OS 203 (S51). The OS 203 generally manages registered device drivers. The applications 202 do not know which device driver should be used and requests a list of the device drivers managed by the OS 203.

The OS 203 returns the registered device drivers to the applications 202 (S52).

The applications 202 select the printer driver 204 from the returned device drivers and provides it with the transmission data and attached data (S53). Actually, it is users who select the printer driver 204. Users must know the uses of the device drivers and use them properly. The printer driver 204 described in this embodiment has a function of converting document data by using a PDL that can be interpreted and printed by the image forming device 100.

After converting document data by using the PDL, the printer driver 204 calls the property information adding function 205 (S54).

The property information adding function 205 reads the property information held by the applications 202 through the OS203. Then, the property information adding function 205 then converts the read property information to a printable PDL format and supplies it to the printer driver 204 (S55). The user might be asked to select items of the property information to be sent to the image forming device 100.

The printer driver 204 merges the data to be originally printed that have been received from the applications 202 and the property information that has been received from the property information adding section 184, and sends it to the image forming device 100 (S56). Communication to the image forming device 100 is made by using a network or USB as described earlier.

According to the embodiment, additional information that is hard to read under visible light can be printed, without impairing the finish of the printed side, as described above.

In the embodiment described above, the UV-color image is printed on the face opposite to the face on which an ordinary-color image is printed, between the two faces of the medium, but the embodiment is not limited to the example.

For example, a UV-color image can be printed in an area in which no ordinary-color image is formed on the face on which the ordinary-color image is printed. More specifically, the UV-color image may be printed in the margin of the face on which an ordinary-color image is formed.

In the embodiment described above, each time the UV-color figure rendering section 176, the UV-color character rendering section 177, or the UV-color image rendering section 178 performs rendering, a horizontally inverted image is rendered by transferring processing to the inversion processing section 179, but the embodiment is not limited to the example. For example, the image data that the UV-color figure rendering section 176, the UV-color character rendering section 177, and the UV-color image rendering section 178 has rendered may be sent to the inversion processing section 179, and the inversion processing section 179 may generate UV-color print image data by horizontally inverting the image data.

In this case, if an image rendered according to the UV-color print image data overlaps an image rendered according to ordinary-color print image data when viewed from the front face of the medium on which these images are printed, it is preferred that the inversion processing section 179 moves the position of the image rendered according to the UV-color print image data so that those images do not overlap. In other words, an image formed on the basis of the UV-color print image data is formed in a way that it does not overlap an image formed on the basis of ordinary-color print image data when viewed from the front face (face on which the image based on the ordinary-color print image data is formed) of a medium.

For example, the inversion processing section 179 may find out the direction in which the size of the image-overlapping area decreases by shifting the position of the center of a rectangular area containing an image rendered according to the UV-color print image data and the position of the center of a rectangular area containing an image rendered according to the ordinary-color print image data, and may move the image rendered according to the UV-color print image data in that direction. The inversion processing section 179 may also prevent the images from overlapping by reducing the size of the image rendered according to the UV-color print image data and may both perform both changing the position of the image and reducing the size of the image.

In the embodiment described above, the image printed in UV color is horizontally inverted, but the embodiment is not limited to the example. For example, the UV-color image may be printed on a face which is the back side of the ordinary-color print side, without being horizontally inverted. For example, if the user includes a command not to invert the UV-color image when the user orders the information processing device 200 to generate PDL data, if a designation not to invert the UV-color image is input on the operation panel 102 of the image forming device 100, or if the image to be printed with UV color does not contain any character, the PDL data analysis section 163 of the image forming device 100 may make a setting to avoid inverting the UV-color image. When the avoidance of inversion of UV-color image can be input on the operation panel 102 of the image forming device 100, the operation panel 102 functions as a setting section to specify whether the UV-color image is inverted or not.

In this embodiment, the image forming device 100 is explained as a multifunctional printer, but the device may be a FAX, a printer, or the like.

REFERENCE CHARACTERS

100 image forming device, 101 communication section, 102 operation panel, 110 control section, 111 communication control section, 112 panel control section, 113 instruction recognition section, 116 job management section, 117 account management section, 118 function management section, 120 function section, 121 scanner function section, 122 FAX function section, 123 media access function section, 124 print function section, 125 E-mail function section, 126 report preparation function section, 130 management section, 131 authority management section, 132 setting value management section, 133 log management section, 140 storage section, 150 print storage section, 151 intermediate code storage section, 152 print image generation buffer, 153 ordinary-color ROP information storage section, 154 ordinary-color information storage section, 155 UV-color ROP information storage section, 156 UV-color information storage section, 157 ordinary-color print image storage section, 158 UV-color print image storage section, 160 print control section, 161 data processing section, 162 PDL data receiving section, 163 PDL data analysis section, 164 color matching processing section, 170 print image generation section, 171 intermediate code discrimination section, 172 rendering processing section, 173 ordinary-color figure rendering section, 174 ordinary-color character rendering section, 175 ordinary-color image rendering section, 176 UV-color figure rendering section, 177 UV-color character rendering section, 178 UV-color image rendering section, 179 inversion processing section, 180 print section, 190 memory, 191 processor, 192 processing circuit, 200 information processing device, 201 control section, 206 storage section, 207 communication section, 208 input section.

What is claimed is:

1. An image forming device comprising:
   a first image forming section which forms a first image included in a plurality of images to be formed on a single page, based on image formation data indicating the images to be formed, on a medium by using a first developer; and
   a second image forming section which forms a second image included in the plurality of images, based on the image formation data, in a non-image-forming area where the first image is not formed on the medium, by using a second developer containing a luminescent substance,
   wherein the second image forming section horizontally inverts the second image and forms the inverted second image in the non-image-forming area.

2. The image forming device of claim 1, wherein the non-image-forming area is a face of the medium, the face being back side of a face on which the first image is formed.

3. The image forming device of claim 2, wherein the second image is formed in a way that the second image does not overlap the first image when the second image is viewed from the face on which the first image is formed.

4. The image forming device of claim 1, wherein the luminescent substance emits light in response to light at a specific frequency.

5. The image forming device of claim 4, wherein the light at a specific frequency is ultraviolet light.

6. An image forming device comprising:
   a first image forming section which forms a first image included in a plurality of images to be formed on a single page, based on image formation data indicating the images to be formed, on a medium by using a first developer;

a setting section which makes a setting indicating whether the second image is horizontally inverted or not; and a second image forming section which forms a second image included in the plurality of images, based on the image formation data, in a non-image-forming area where the first image is not formed on the medium, by using a second developer containing a luminescent substance, wherein the second image forming section horizontally inverts the second image and forms the inverted second image in the non-image-forming area if the setting section makes the setting indicating that the second image is horizontally inverted, or forms the second image in the non-image-forming area without horizontally inverting the second image if the setting section makes the setting indicating that the second image is not horizontally inverted.

7. The image forming device of claim 6, wherein the non-image-forming area is a back side of a face of the medium on which the first image is formed.

8. The image forming device of claim 7, wherein the second image is formed in a way that the second image does not overlap the first image when the second image is viewed from the face on which the first image is formed.

9. The image forming device of claim 6, wherein the luminescent substance emits light in response to light at a specific frequency.

10. The image forming device of claim 9, wherein the light at a specific frequency is ultraviolet light.

11. An image forming method comprising steps of:

forming a first image included in a plurality of images to be formed on a single page, based on image formation data indicating the image to be formed, on a medium by using a first developer; and forming a second image included in the plurality of images, based on the image formation data, in a non-image-forming area where the first image is not formed on the medium, by using a second developer containing a luminescent substance, wherein in the step of forming the second image, the second image is horizontally inverted and the inverted second image is formed in the non-image-forming area.

12. An image forming method comprising:

forming a first image included in a plurality of images to be formed on a single page, based on image formation data indicating the image to be formed, on a medium by using a first developer;

setting an inversion state of the second image to indicate whether to horizontally invert the second image when forming the second image;

forming the second image included in the plurality of images, based on the image formation data, in a non-image-forming area where the first image is not formed on the medium, by using a second developer containing a luminescent substance, wherein forming the second image includes horizontally inverting the second image in the non-image-forming area if the inversion state of the second image indicates the second image is to be inverted, or forming the second image without horizontally inverting the second image if the setting state indicates that the second image is not to be horizontally inverted.

* * * * *